United States Patent [19]

Yanagi et al.

[11] Patent Number: 5,142,520
[45] Date of Patent: Aug. 25, 1992

[54] SYSTEM FOR OBTAINING OPTIMUM FOCUSING POSITION IN OPTICAL DISC SYSTEM

[75] Inventors: Shigenori Yanagi, Kawasaki; Akira Minami, Inagi; Masateru Sasaki, Yokohama; Shigeru Arai, Zushi; Toshitaka Iwamoto; Hidenori Saitoh, both of Kawasaki, all of Japan

[73] Assignee: Fujitsu Limited, Kawasaki, Japan

[21] Appl. No.: 372,523

[22] Filed: Jun. 28, 1989

[30] Foreign Application Priority Data

Jun. 29, 1988 [JP] Japan ................ 63-162311

[51] Int. Cl.⁵ ............................................ G11B 5/09
[52] U.S. Cl. ..................... 369/48; 369/44.32; 369/44.34; 369/44.31; 369/44.37
[58] Field of Search .......... 369/44.32, 44.33, 44.34, 369/41.25, 44.31, 44.37, 44.38, 44.39, 54, 58, 109, 124

[56] References Cited

U.S. PATENT DOCUMENTS

| | | | |
|---|---|---|---|
| 4,346,471 | 8/1982 | Hirasawa et al. | 369/44 |
| 4,357,696 | 11/1982 | Bierhoff | 369/44.13 |
| 4,379,256 | 4/1983 | Maury | 318/561 |
| 4,419,701 | 12/1983 | Harrison et al. | 360/787 |
| 4,613,916 | 9/1986 | Johnson | 360/78 |
| 4,633,453 | 12/1986 | Ogawa | 369/44 |
| 4,669,072 | 5/1987 | Miura et al. | 369/44.33 X |
| 4,707,648 | 11/1987 | Minami | 369/44.34 X |
| 4,736,354 | 4/1988 | Yoshio | 369/44.34 X |
| 4,747,089 | 5/1988 | Eguchi et al. | 369/44.34 X |
| 4,855,983 | 8/1989 | Arai | 369/44.34 X |

FOREIGN PATENT DOCUMENTS

| | | |
|---|---|---|
| 530869 | 8/1983 | Australia. |
| 0036222 | 3/1979 | European Pat. Off. ......... 369/44.32 |
| 0026109 | 4/1981 | European Pat. Off. . |
| 0095852 | 12/1983 | European Pat. Off. . |
| 0225258 | 6/1987 | European Pat. Off. . |
| 3602640 | 8/1986 | Fed. Rep. of Germany. |
| 2138179 | 10/1984 | United Kingdom. |

Primary Examiner—Roy N. Envall, Jr.
Assistant Examiner—Robert Chevalier
Attorney, Agent, or Firm—Staas & Halsey

[57] ABSTRACT

A system for obtaining an optimum focusing position in an optical disc system. An optical beam is impinged onto a track of an optical disc, and a reflection signal having information regarding an intensity of an optical beam reflected by an optical disc is obtained. A predetermined frequency component, the frequency component being generated by a modulation caused by an existence of a pit on a track of the optical disc in a reflecting signal, is extracted from the reflection signal. Then a focus position in which a maximum intensity of the extracted frequency component is obtained is searched by changing the focus position of the optical beam. Further, the above system is incorporated in a focus servo control system for maintaining an optimum focusing position in an optical disc system during reading and writing operations, to determine an optimum offset value which is to be adjusted to compensate an error arisen from a construction of the focus servo control system, during an offset adjusting operation.

30 Claims, 12 Drawing Sheets

TRACK SURFACE

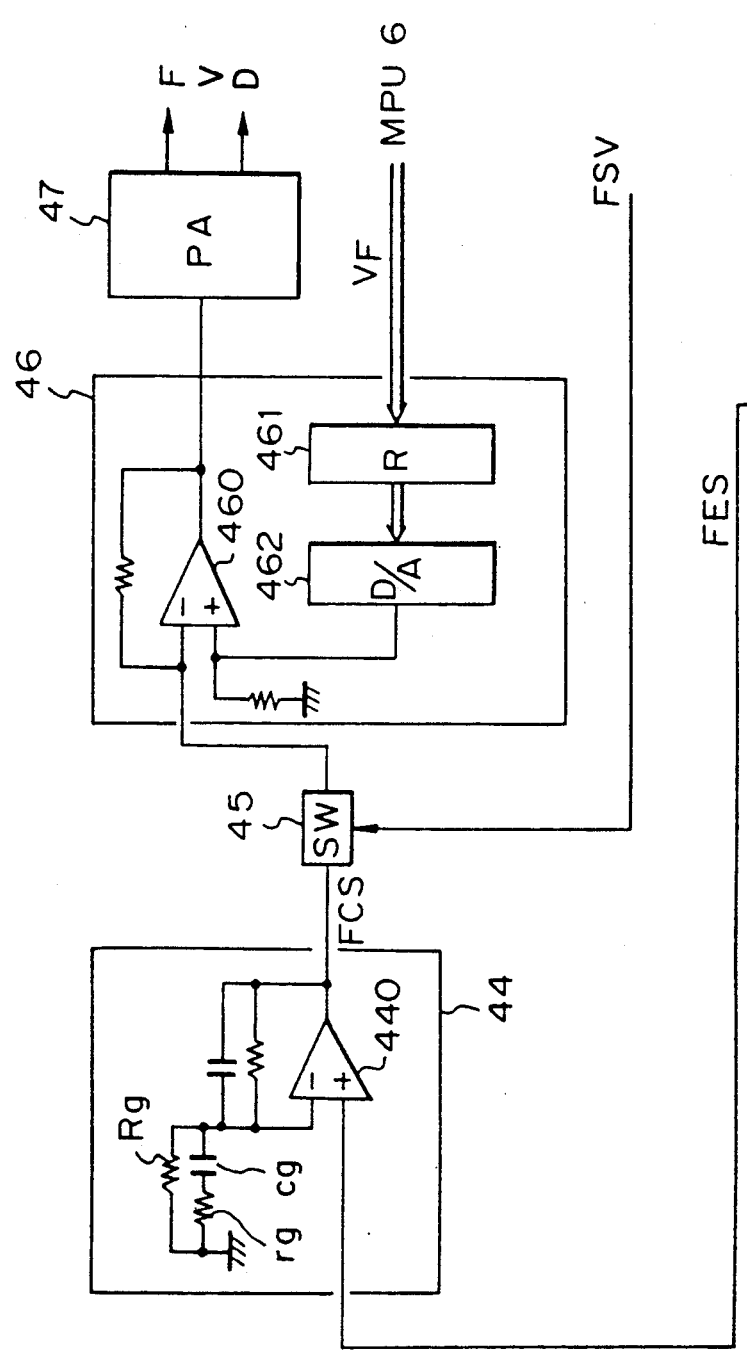

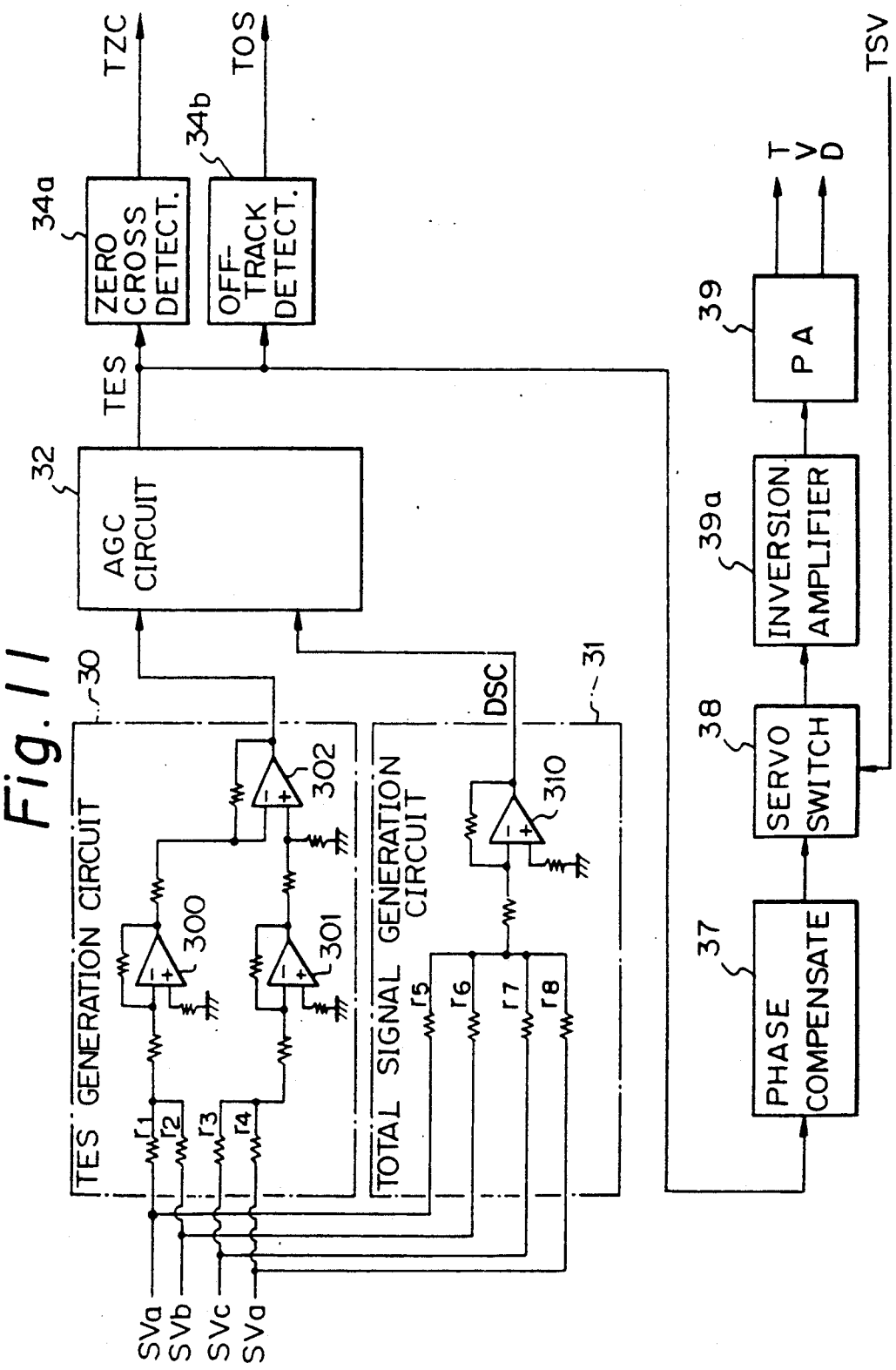

Fig. 12A
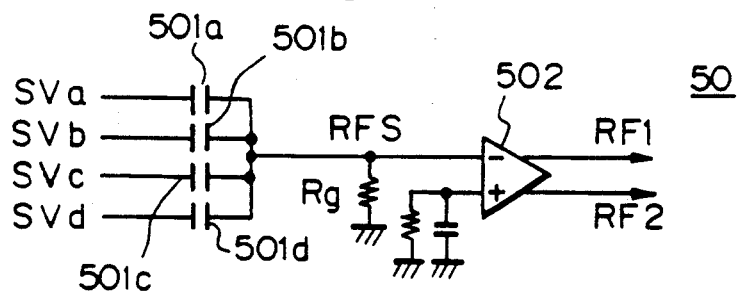
Fig. 12B
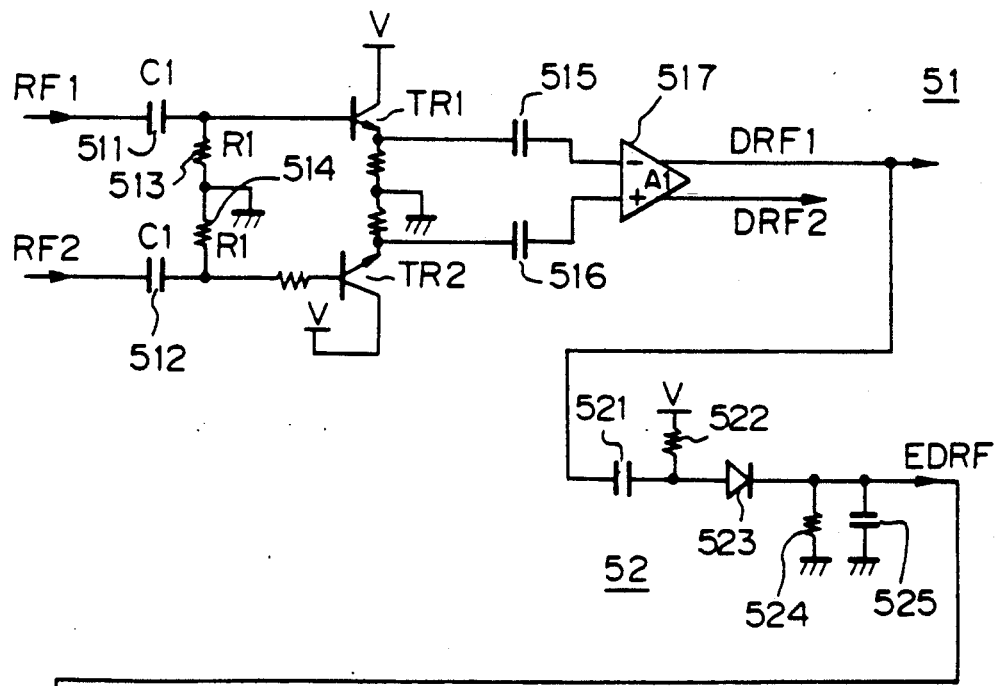
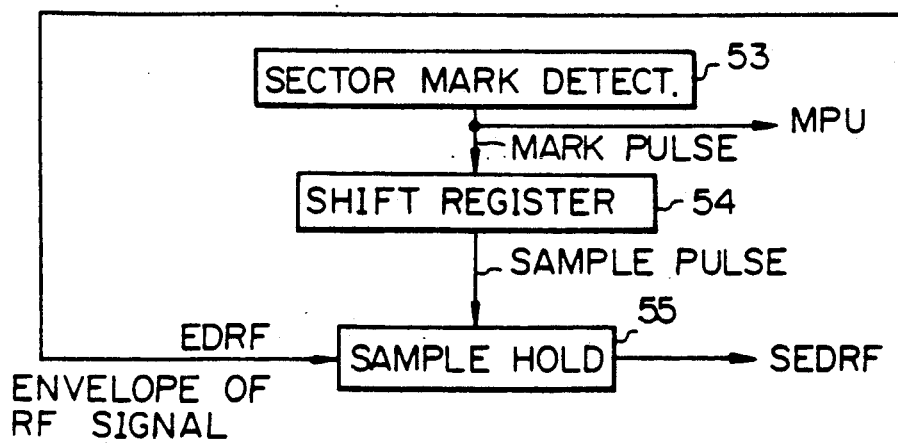

Fig. 13(a)
RF SIGNAL
(RECORDED PORTION)
Fig. 13(b)
RF SIGNAL
(NON-RECORDED PORTION)
Fig. 13(c)
EDRF
(RECORDED PORTION)
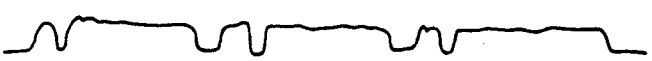
Fig. 13(d)
EDRF
(NON-RECORDED PORTION)
Fig. 13(e)
SEDRF
(RECORDED PORTION)
SEDRF
(NON-RECORDED PORTION)
SAMPLING TIME

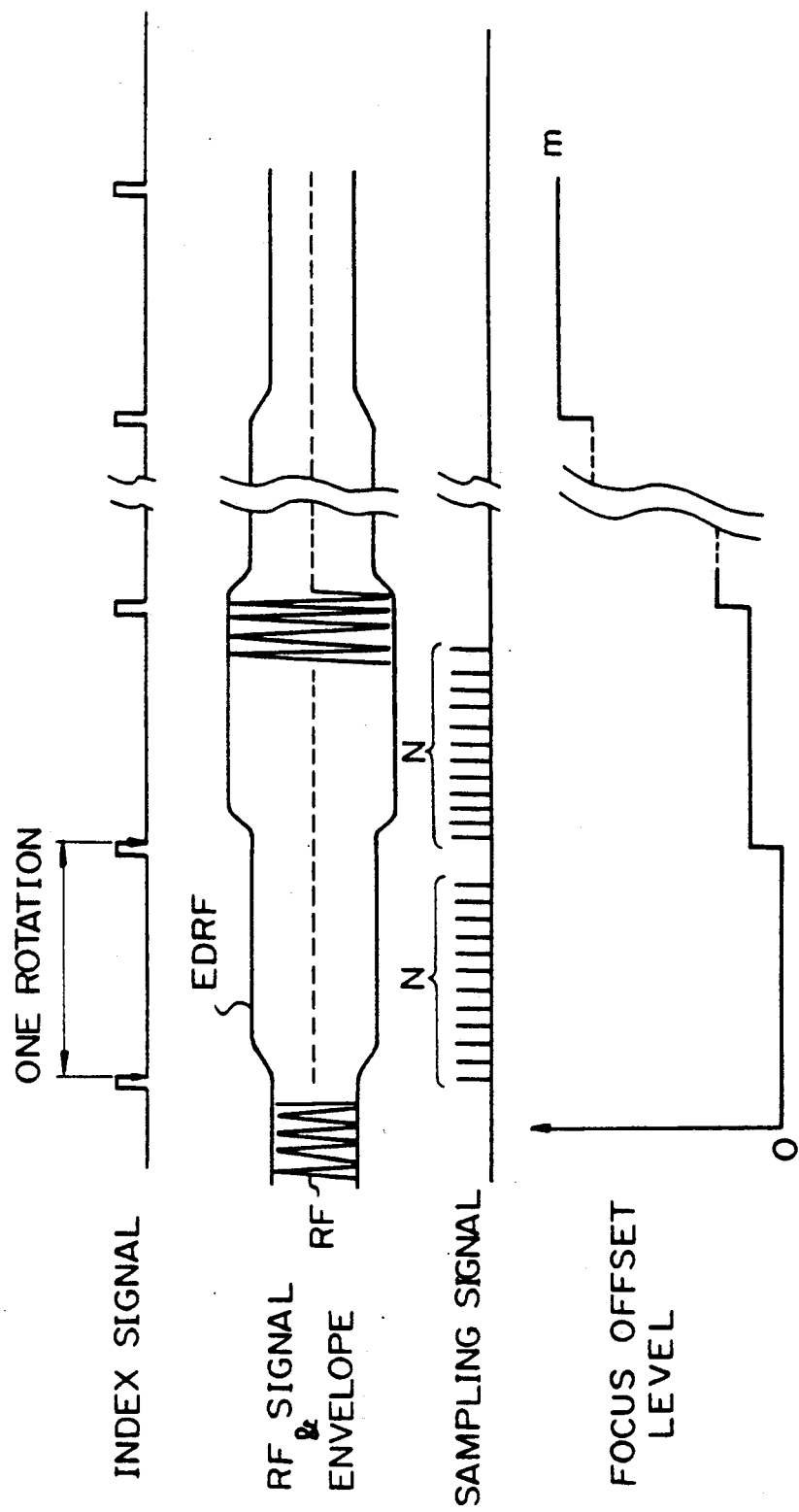

SYSTEM FOR OBTAINING OPTIMUM FOCUSING POSITION IN OPTICAL DISC SYSTEM

BACKGROUND OF THE INVENTION (1) Field of the Invention

The present invention relates to a system for obtaining an optimum focusing position in an optical disc system, and further, relates to a focus servo control system for maintaining an optimum focusing position in an optical disc system during reading and writing operations, wherein the system for obtaining an optimum focusing position by an offset adjustment is incorporated.

Optical discs are used as large capacity external memories. The optical discs have a narrow (a few micrometer-width) track which is usually preformed spirally on its own surface.

Data is written on the track surface by impinging a high-intensity optical (light) beam onto the track surface to form a pit, and is read by impinging a low-intensity optical beam onto the track surface. Then, variations of the intensity of an optical beam reflected at the track surface caused by a pit are detected.

To carry out an effective and accurate writing and reading operation, the optical beam impinged onto the track surface is required to be focused in an optimum condition on the track surface.

(2) Description of the Related Art

FIG. 1 shows an outline of the construction of an optical disc apparatus.

In FIG. 1, reference numeral 1 denotes an optical disc, 11a denotes a rotation mechanism such as a motor, 11b denotes an rotating axle, 12 denotes a optical head, 13 denotes a track servo control portion, 14 denotes a focus servo control portion, 20 denotes a semiconductor laser device, 21a denotes a lens, 22 denotes a polarized beam splitter, 23 denotes a quarter wavelength plate, 24 denotes a mirror, 25 denotes an objective lens, 26 denotes a track actuator, 27 denotes a focus actuator, and 28 denotes a light sensing device.

The optical disc 1 is driven and rotates by the motor 11a through the rotating axle 11b. The optical head is moved in the radial direction by an actuating device (not shown) driven by a motor (not shown), and is then positioned to write or read data on an objective track of the optical disc 1.

In the optical head 12, light emitted from the semiconductor device 20 is lead and focused through the lens 21a, beam splitter 22, quarter wavelength plate 23, mirror 24, and objective lens 25, and is then impinged onto the track surface of the optical disc 1. A light reflected by the track surface is lead through the objective lens 25, the mirror 24, the quarter wavelength plate 23, the beam splitter 22, and the lens 21b, to the light sensing device 28, and thus, is detected at the light sensing device 28.

Responding to the above detected signal, the light sensing device 28 generates an electric reflection signal, the amplitude of which corresponds to the intensity of the reflected and detected signal.

Generally, tracks are formed spirally or concentrically on optical discs at the pitch of a few micrometers, and the extension of a focused beam spot area on the track surface is less than one micrometer.

However, some eccentricity of an amount comparable with the above pitch or more may exist in the arrangement of the above tracks on optical discs. In addition, some waviness, which causes an off-focus at the track surface of optical discs, may exist in optical discs.

In spite of the above situation, the optical beam is required to be focused on the track surface, and the focused beam spot must follow the above narrow track. To fulfill the above requirement, the focus actuator (focus coil) 27, the focus servo control portion 14, the track actuator (track coil) 26, and the track servo control portion 13 are provided.

The focus actuator 27 moves the objective lens 25 in the optical head 12 in a direction perpendicular to the surface of the optical disc 1 to adjust the focus position of the impinging optical beam under the control of the focus servo control portion 14. The focus servo control portion 14 receives the output of the light sensing device 28, which consists of a plurality of receiving light signals, and generates a focus error signal (FES) to drive the focus actuator 27 in a feedback mode so that the optimum focus condition at the track surface of the optical disc 1 is maintained.

The track actuator 26 moves the objective lens 25 in the optical head 12 in the radial direction of the optical disc 1 to adjust the position of the impinging optical beam in the radial direction under the control of the track servo control portion 13. The track servo control portion 13 receives the output of the light sensing device 28, which consists of a plurality of receiving light signals, and generates a track error signal (TES) to drive the track actuator 26 in a feedback mode so that the position of the impinging optical beam is maintained at the center of the track width of the optical disc 1.

The principle of the focus servo control is explained with reference to FIGS. 2 to 4.

In FIG. 2, "f" denotes an on-focus condition wherein a focus position of an impinging light beam is just on the track surface of the optical disc 1, "f1" denotes an off-focus condition wherein a focus position of an impinging light beam is under the track surface of the optical disc 1, and "f2" denotes an off-focus condition wherein a focus position of an impinging light beam is above the track surface of the optical disc 1.

FIGS. 3A, 3B, and 3C show distributions of intensity of received light on a light input surface of the light sensing device 28. FIG. 3A shows the distribution in the above off-focus condition "f1", FIG. 3B shows the distribution in the above on-focus condition "f", and FIG. 3C shows the distribution in the above off-focus condition "f2".

The light sensing device 28 consists of four light sensing detectors. Each light sensing detector corresponds to one of four quadrants, each of which is denoted by "a", "b", "c", and "d", respectively.

The aforementioned focus error signal (FES) is defined as $$FES = (a+b) - (c+d),$$

where "FES" denotes an intensity of the focus error signal (FES), "a" denotes an intensity of the light received by the light sensing detector "a", "b" denotes an intensity of the light received by the light sensing detector "b", "c" denotes an intensity of the light received by the light sensing detector "c", and "d" denotes an intensity of the light received by the light sensing detector "d", respectively. The focus error signal (FES) is obtained in the focus servo control portion 14.

FIG. 4 shows a variation of the amplitude of the above focus error signal (FES) as a function of the focus position regarding the track surface. Since the value of the focus error signal (FES) in the above on-focus condition "f" is zero, the focus servo control portion 14 controls the focus actuator 27 according to the above obtained value of the focus error signal (FES) so as to maintain the FES value near zero. Thereby the focusing position is maintained on the track surface in the resolution of a sub-micron order, even when waviness exists in the optical disc 1.

The principle of the track servo control is explained with reference to FIGS. 5 to 7.

In FIG. 5, "P" denotes a condition wherein a spot area of an impinging light beam is at the center of the track width of the optical disc 1. "P1" denotes an off-track condition wherein a spot area of an impinging light beam is in one side of the center of the track width of the optical disc 1. "P2" denotes an off-track condition wherein a spot area of an impinging light beam is in the other side of the center of the track width of the optical disc 1.

FIGS. 6A, 6B, and 6C show distributions of intensity of received light on a light input surface of the light sensing device 28. FIG. 6A shows the distribution in the above off-track condition "P1". FIG. 6B shows the distribution in the above condition "P". FIG. 6C shows the distribution in the above off-track condition "P2".

The aforementioned track error signal (TES) is defined as $$TES = (a+d) - (c+b).$$

where "TES" denotes an intensity of the track error signal (TES), and the track error signal (TES) is obtained in the track servo control portion 13.

FIG. 7 shows a variation of the amplitude of the above track error signal (TES) as a function of the position of the spot area of the impinging light beam regarding the center of the track width. Since the value of the track error signal (TES) in the above on-track condition "P" is zero, the track servo control portion 13 controls the track actuator 26 according to the above obtained value of the track error signal (TES) so as to maintain the TES value near zero. Thereby the position of the spot area of the impinging light beam is maintained at the center of the track width in the optical disc 1, even when an eccentricity exists in the optical disc 1.

In an actual focus servo control system, however, the situation wherein the above value of the focus error signal (FES) obtained from the intensity of light detected at the light sensing device 28 is zero, does not necessarily correspond to the true on-focus condition wherein the focusing position is actually on the track surface of the optical disc 1, due to an off-center positioning of the light sensing device 28, or a level offset which arises in the internal circuit realizing the focus servo control system (portion 14). Therefore, it is necessary to adjust an offset value in an appropriate stage in the focus servo control portion 14.

To adjust the above offset value, a plurality of systems are proposed in the prior art.

U.S. Pat. No. 4,707,648 described the technique wherein the offset value which yields the maximum amplitude of the track error signal (TES) is obtained as the optimum offset value.

The measurement of the amplitude of the track error signal (TES) is carried out by rotating the optical disc without a track servo operation. A high frequency track error signal (TES) is required to be used in the measurement for obtaining a precise amplitude of the track error signal (TES). The high frequency of the track error signal (TES) means a large amount of eccentricity of the tracks on the optical disc because the variation of the level of the track error signal (TES) is caused when the impinging light beam traverses grooves, which are concave portions located between adjacent tracks as shown in FIG. 5. The phase difference of the light wave reflected at the groove from the phase of the light wave reflected at the track surface causes an interference between the light waves and decreases the intensity of the total reflected light.

However, recently, it is known that the optimum offset level obtained from the amplitude of the track error signal (TES) including the track error signal (TES) during the traverse of the grooves, does not necessarily give the actual optimum on-focus condition which enables the most precise operation of writing or reading data, i.e., the most precise operations of forming a pit on the track surface or detecting a pit on the track surface because the above traverse of the grooves shifts the optimum focusing position from the above actual optimum on-focus condition at the pits.

In another prior art technique, the offset value which yields the maximum direct current level of the intensity of the total reflected light from the surface of the optical disc, i.e., the output of the light sensing device 28, is obtained as the optimum offset value.

However, the optical system for impinging a light beam onto the track surface of the optical disc includes an astigmatic error due to a distortion of the optical components by temperature change or aging. Concretely, the astigmatism causes an elongated spot shape of the impinging light beam on the track surface of the optical disc. The above direct current level of the intensity of the total reflected light from the surface of the optical disc becomes a maximum when an elongated beam spot lies within the track surface area as shown in FIG. 8. Since data is written in the form of a series of pits, and is read by whether or not a pit exists at positions having predetermined (angular) intervals with each other, on a track, the beam spot elongated in the direction of the track may cause a serious error in writing or reading operations.

SUMMARY OF THE INVENTION

An object of the present invention is to provide a system for obtaining an optimum focusing position to write or read information in the form of whether or not a pit exists on a track surface of an optical disc without being affected by astigmatism in an optical system.

Another object of the present invention is to provide a focus servo control system for maintaining an optimum focusing position in an optical disc system during reading and writing operations, and having an offset adjustment system to compensate an error arising from an electric or geometric construction of the focus servo control system. An optimum offset value for maintaining an optimum focusing position to write or read information in the form of whether or not a pit exists on a track surface of an optical disc can be obtained without being affected by astigmatism in an optical system.

According to a first aspect of the present invention, there is provided a system for obtaining an optimum focusing position in an optical disc system, comprising an optical beam impinging means for impinging an optical beam onto a track of an optical disc, a reflection signal obtaining means for obtaining a reflection signal having information of an intensity of an optical beam reflected by an optical disc, a filtering means for extracting a predetermined frequency component from the reflection signal, which component is generated in a reflecting signal by a modulation caused by an existence of a pit on a track of the optical disc, a focus position changing means for changing the focus position of the optical beam, and an optimum focusing position searching means for searching for a focus position wherein a maximum intensity of the output of the filtering means is obtained.

According to a second aspect of the present invention, there is provided a focus servo control system for maintaining an optimum focusing position in an optical disc system during reading and writing operations, comprising an optical beam impinging means for impinging an optical beam on a track of an optical disc, a reflection signal obtaining means for obtaining a reflection signal having information of an intensity of an optical beam reflected by an optical disc, a focus position changing means for changing the focusing position of an optical system, a servo control means for controlling the focus position changing means according to the reflection signal, an offset adjusting means for adjusting an offset which is used to compensate an error arising from a construction of the focus servo control system, a filtering means for extracting a frequency component from the reflection signal, which component is generated in a reflecting signal by a modulation caused by a pit located on a track of the optical disc, and an optimum offset value obtaining means for obtaining an optimum value of the offset whereby a maximum intensity of the output of the filtering means is obtained by scanning the offset, during an offset adjusting operation.

BRIEF DESCRIPTION OF THE DRAWINGS

In the drawings:

FIG. 10 including FIGS. 10A and 10B, is a circuit diagram of the focus servo control portion 4;

FIG. 11 is a circuit diagram of the track servo control portion 3;

FIGS. 12A and 12B are circuit diagrams of the RF signal amplitude detecting portion 5;

FIGS. 13a-13e are examples of the waveform of the RF (sum) signal RF1;

FIG. 16 is a timing diagram showing the signal levels regarding the operation in an embodiment according to the present invention.

DESCRIPTION OF THE PREFERRED EMBODIMENTS

Figure 1:
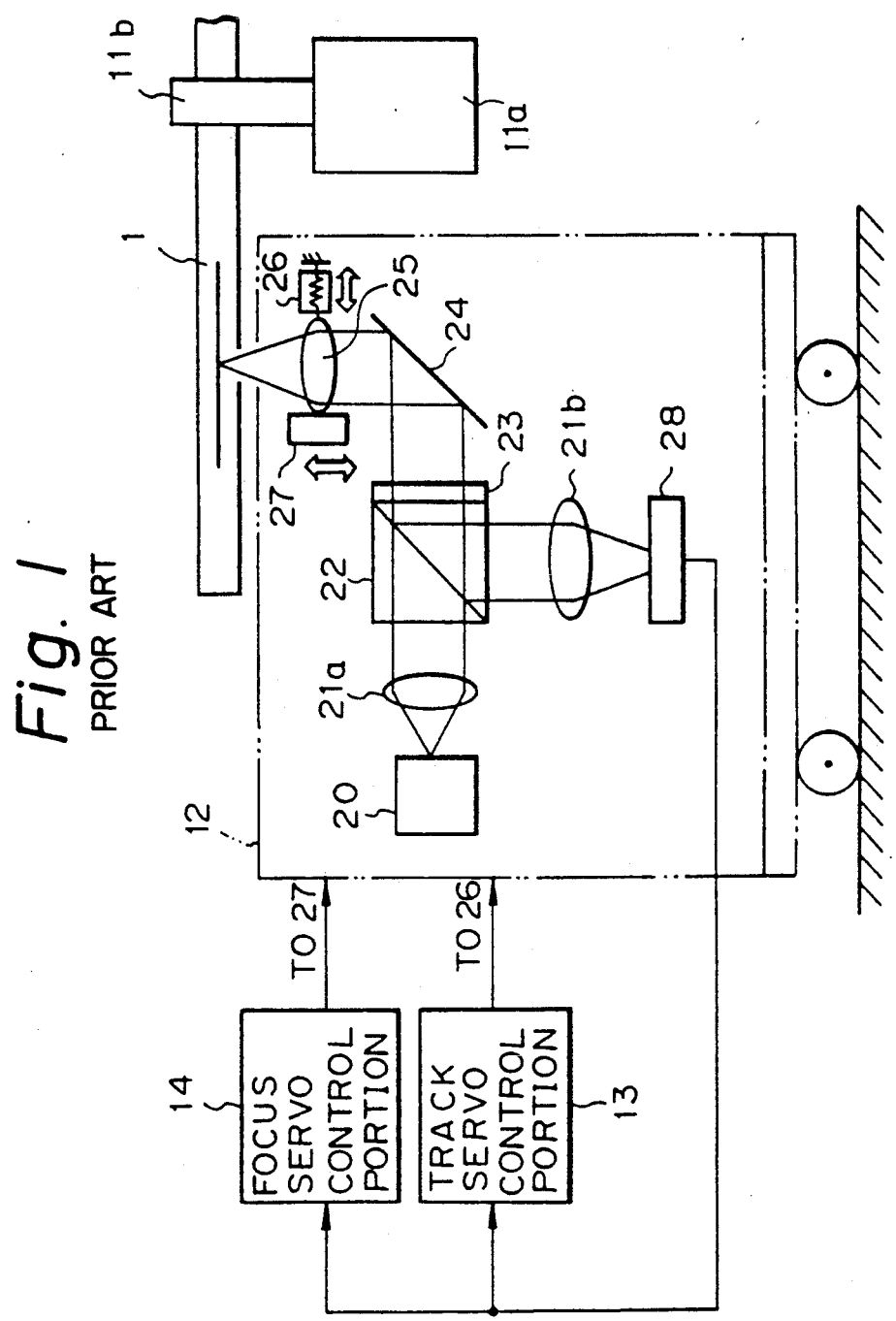
FIG. 1 is an outline of the construction of an optical disc apparatus.
Figure 2:
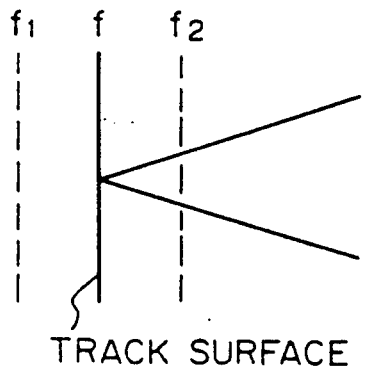
FIG. 2 shows on-focus and off-focus conditions of an impinging light beam onto the track surface of the optical disc.
Figure 3A:
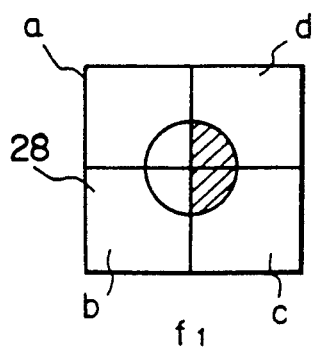
FIGS. 3A, 3B, and 3C are distributions of intensity of received light on a light input surface of a light sensing device.
Figure 3B:
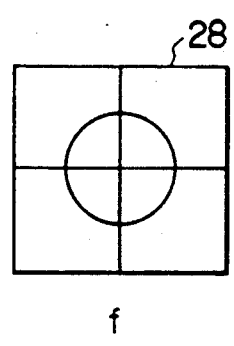
Figure 3C:
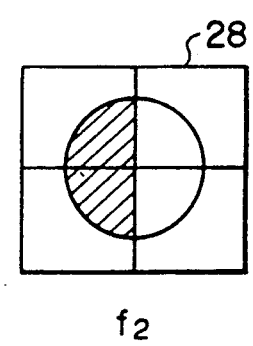
Figure 4:
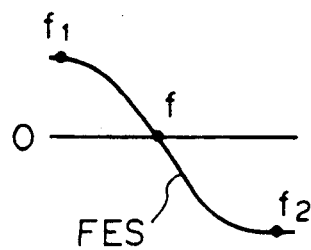
FIG. 4 is a graph of the variation of the amplitude of the focus error signal (FES) as a function of the focus position regarding the track surface.
Figure 5:
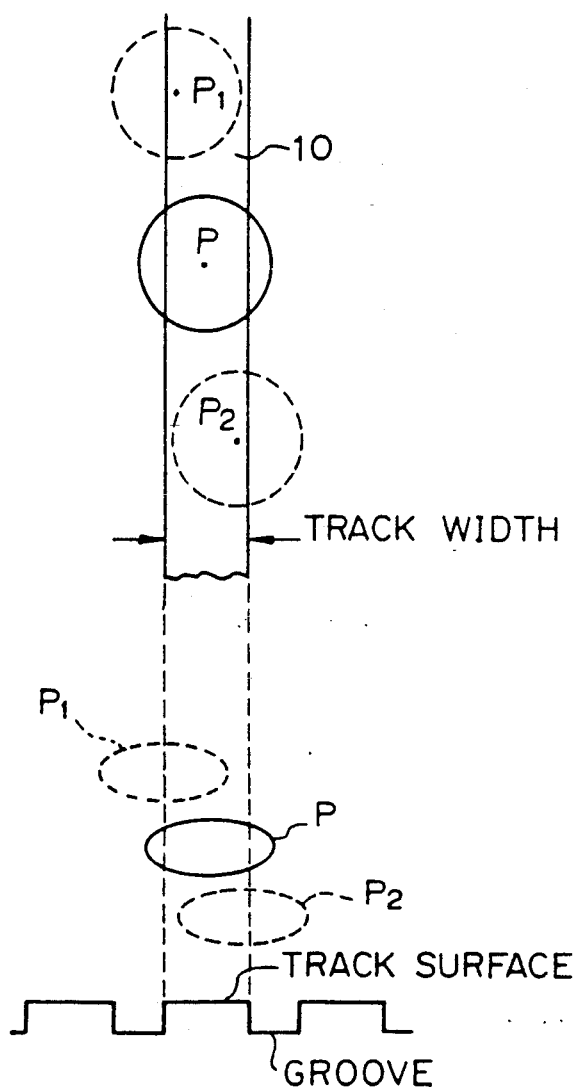
FIG. 5 shows on-track and off-track conditions of an impinging light beam onto the track surface of the optical disc.
Figure 6A:
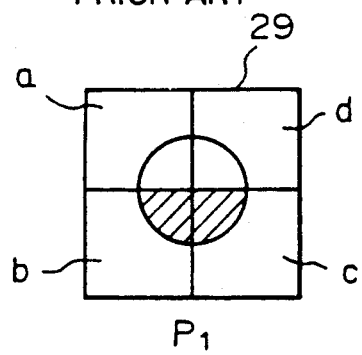
FIGS. 6A, 6B, and 6C are distributions of intensity of a received light on a light input surface of the light sensing device.
Figure 6B:
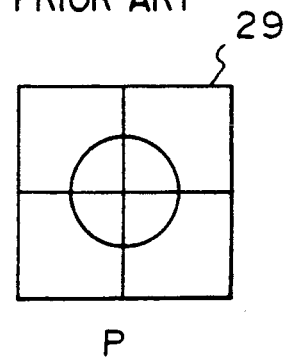
Figure 6C:
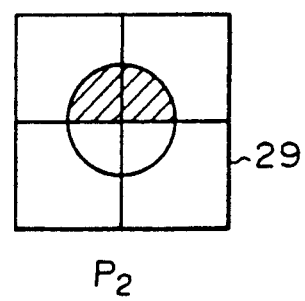
Figure 7:
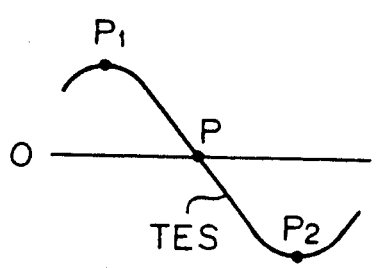
FIG. 7 is a graph of a variation of the amplitude of the track error signal (TES) as a function of the position of the spot area of the impinging light beam regarding the center of the track width.
Figure 8:
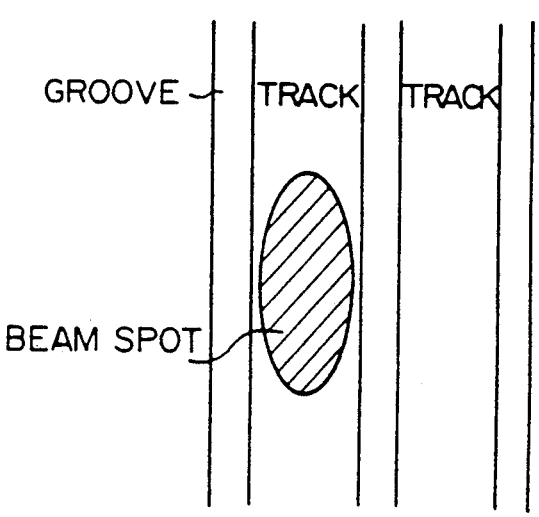
FIG. 8 is an elongated beam spot lying within the track surface area.

Before describing the preferred embodiment of the present invention, the basic principle of the present invention is explained below.

As described in the summary of the invention, in a system for obtaining an optimum focusing position in an optical disc system, according to the first aspect of the present invention, a predetermined frequency component of a reflection signal (the component being generated by a modulation caused by an existence of a pit on a track of the optical disc in a reflecting signal) is extracted by a filtering means. Then a focus position wherein a maximum intensity of the output of the filtering means is obtained, is searched by changing the focus position of the optical beam using the focus position changing means.

Thus, according to the first aspect of the present invention, the optimum focusing position at which the optical system is most sensitive regarding a pit on a track, can be obtained regardless of the astigmatism in the optical system.

In addition, when the above system further comprises a track servo control means for maintaining a position of the surface of the optical disc where the optical beam is impinging, in an optimum position on a track, and the track servo control means is operated during the operation of the optimum focusing position searching means, the operation for obtaining the optimum focus position can be carried out in an on-track condition through the operation. Therefore, the operation is not adversely affected by the off-track condition, and thus, a better result of the optimum focus position can be expected.

Further, in a focus servo control system for maintaining an optimum focusing position in an optical disc system during reading and writing operations, according to the second aspect of the present invention, the above principle of the first aspect of the present invention is applied to determine an optimum offset value which is used to compensate an error arising from a construction of the focus servo control system. That is, an optimum value of the offset which gives a maximum intensity of the output of the filtering means is obtained by scanning the offset, during an offset adjusting operation.

As described in the summary of the invention, the focus servo control system for maintaining an optimum focusing position in an optical disc system during a reading and writing operation, according to the second aspect of the present invention comprises a focus position actuating means, a focus position driving means, a reflection signal obtaining means, a servo control means, a filtering means, an offset adjusting means for adjusting an offset which is used to compensate an error arising from a construction of the focus servo control system, and an optimum offset value obtaining means.

The focus servo control for maintaining an optimum focusing position, is basically carried out by the optical beam impinging means, the reflection signal obtaining means, the focus position changing means, and the servo control means. That is, an optical beam is impinged on a track of an optical disc by the optical beam impinging means. Then a reflection signal having information regarding an intensity of an optical beam reflected by an optical disc is obtained by the reflection signal obtaining means. The servo control means controls the focus position changing means to change the focusing position of an optical system (comprising the above optical beam impinging means and the reflection signal obtaining means) according to the reflection signal.

The offset adjusting operation is carried out by the filtering means, the offset adjusting means, and the optimum offset value obtaining means, together with the above optical beam impinging means, the reflection signal obtaining means, the focus position changing means, and the servo control means.

The offset adjusting means is provided for adjusting an offset which is used to compensate an error arising from a construction of the focus servo control system.

The above-mentioned basic principle of the first aspect of the present invention is applied to obtain an optimum value of the above offset.

That is, a predetermined frequency component of a reflection signal (which is generated by a modulation caused by an existence of a pit on a track of the optical disc in a reflecting signal) is extracted by a filtering means. Then an optimum offset value whereby a maximum intensity of the output of the filtering means is obtained, is searched by changing the focus position of the optical beam using the focus position changing means, by the optimum offset value obtaining means during an offset adjusting operation.

Thus, according to the second aspect of the present invention, the optimum offset value at which the optical system is most sensitive regarding a pit on a track, can be obtained regardless of the astigmatism in the optical system.

In addition, when the above system further comprises a track servo control means for maintaining a position of the surface of the optical disc where the optical beam is impinging in an optimum position on a track, and the track servo control means is operated during the operation of the optimum offset value obtaining means, the operation for obtaining the optimum focus offset can be carried out in an on-track condition through the operation. Therefore, the operation is not adversely affected by the off-track condition, and thus, a better result of the optimum focus offset can be expected.

Hereinafter, the preferred embodiment of the present invention is explained with reference to the drawings.

Figure 9:
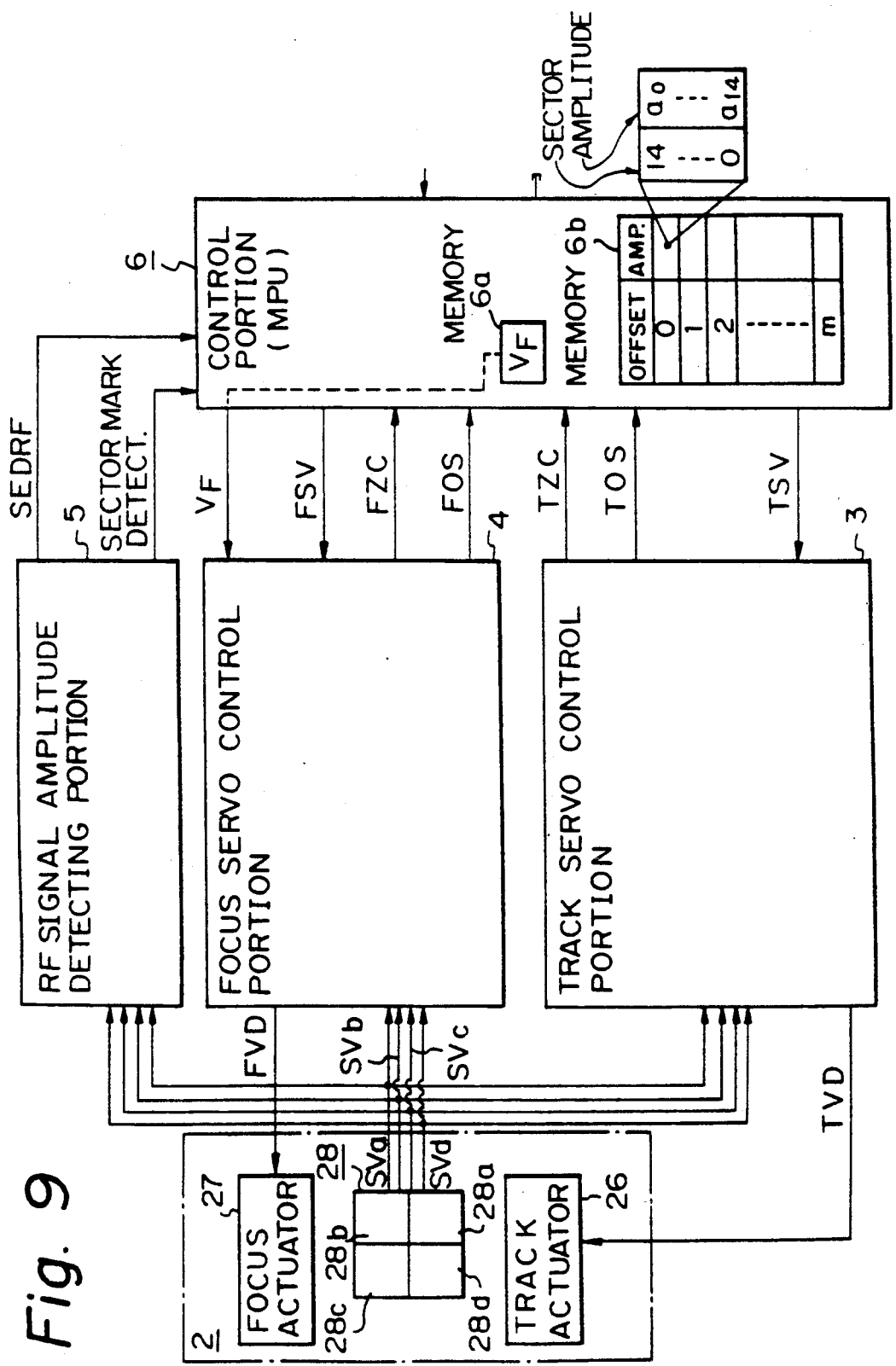
FIG. 9 is a block circuit diagram of the construction of a servo control system in an optical disc system according to an embodiment of the present invention.

FIG. 9 is a block diagram of the construction of a servo control system in an optical disc system according to an embodiment of the present invention.

In FIG. 9, reference numeral 3 denotes a track servo control portion, 4 denotes a focus servo control portion, 5 denotes an RF signal amplitude detecting portion, 6 denotes an MPU (microcomputer unit) as a control portion, and 2 denotes the optical head.

Each of the track servo control portion 3, the focus servo control portion 4, and the RF signal amplitude detecting portion 5 receives four outputs (reflection signals) SVa, SVb, SVc, and SVd from the aforementioned four light sensing detectors "a", "b", "c", and "d".

The control portion 6 receives a track zero cross signal TZC and an off-track signal TOS from the track servo control portion 3, focus zero cross signal FZC and an off-focus signal FOS from the focus servo control portion 4, and a digital RF amplitude signal SEDRF and a sector mark detection signal from the RF signal amplitude detecting portion 5. The control portion 6 then outputs a track servo-ON signal TSV to the track servo control portion 3, a focus servo-ON signal FSV and a focus offset value VF to the focus servo control portion 4 to control both the track servo control portion 3 and the focus servo control portion 4. Further, the control portion 6 controls the motor to move the optical head 2.

The memory 6a holds the focus offset value VF, and the work area (memory) 6b holds amplitudes of RF signals for a plurality of sectors for each offset value VF. The control portion 6 calculates the optimum offset value using the data held in the work area 6b.

Figure 10B:
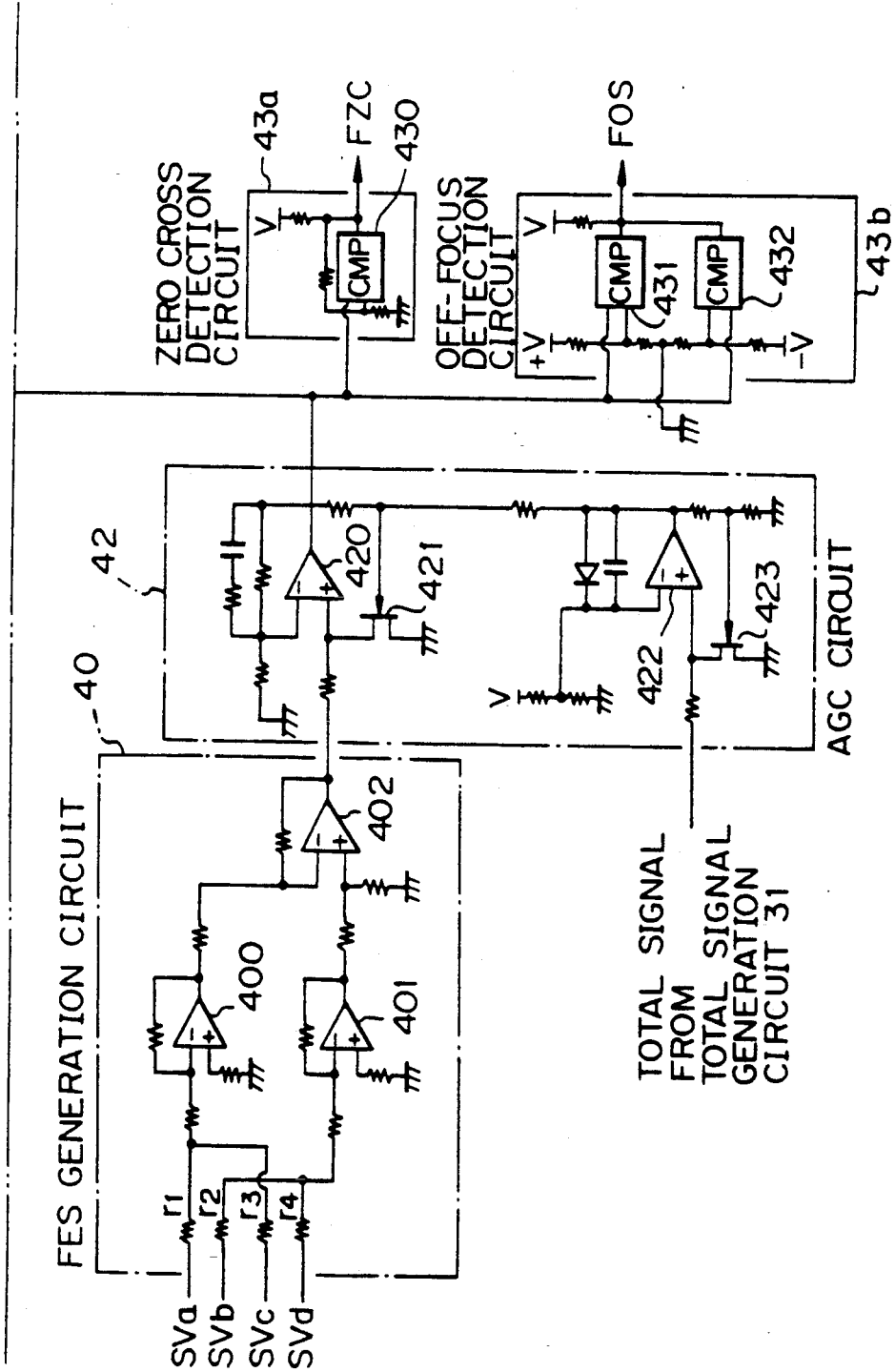

FIG. 10, including FIGS. 10A and 10B, are circuit diagrams of the focus servo control portion 4.

In FIG. 10B, reference numeral 40 denotes an FES generation circuit, 42 denotes an AGC circuit, 43a denotes a zero cross detection circuit, and 43b denotes an off-focus detection circuit. In FIG. 10A, 44 denotes a phase compensating circuit, 45 denotes a servo switch, 46 denotes a focus offset adding circuit, and 47 denotes a power amplifier.

The FES generation circuit 40 receives the above-mentioned four outputs (reflection signals) SVa, SVb, SVc, and SVd, and generates a focus error signal (FES) in accordance with the equation, FES=(SVa+SVc)−(SVb+SVd).

The FES generation circuit 40 shown in FIG. 10B, comprises an addition amplifier 400 which outputs a sum of the above outputs SVa and SVc, an addition amplifier 401 which outputs a sum of the above outputs SVb and SVd, and a subtraction amplifier 402 which outputs the above focus error signal (FES)=(SVa+SVc)−(SVb+SVd).

The AGC circuit 42 obtains an AGC output by dividing the value of the above focus error signal (FES) by the value of a total reflection signal (DSC). The total reflection signal (DSC) is defined as the equation, DSC=(SVa+SVb)+(SVc+SVd), and is generated in a total signal generation circuit 31, which is shown in FIG. 11. The total reflection signal DSC indicates a total reflection level of the reflected light beam. Thus, corrections for variations of the intensity of the impinging light beam and the reflection rate are made for the focus error signal (FES).

The AGC circuit 42 shown in FIG. 10B, comprises a first amplifier 420 which amplifies the above focus error signal (FES), a first FET (field effect transistor) 421 which controls the input of the first amplifier 420 by dividing the voltage of the input according to the output level of the first amplifier 420 and a second amplifier 422, the second amplifier 422 which receives the total reflection signal (DSC) and controls the first FET 421 according to the total reflection signal (DSC), and a second FET 423 which controls the input of the second amplifier 422 by dividing the voltage of the input of the second amplifier 422 according to the output level of the second amplifier 422 to compensate a non-linearity of the output of the first amplifier 420 and give a linear characteristic to the output. Accordingly, the gain of the first amplifier 420 is controlled by the total reflection signal (DSC) through the output of the second amplifier 422, and an AGC-controlled focus error signal (FES) is obtained as the output of the first amplifier.

The zero cross detection circuit 43a outputs a zero cross signal FZC to the MPU 6 when a zero cross point of the focus error signal (FES) level is detected.

The zero cross detection circuit 43a shown in FIG. 10B, comprises a comparator 430 which compares the level of the output of the above AGC circuit 42 with the zero level, and outputs the above zero cross signal when a zero cross point of the focus error signal (FES) level is detected.

The off-focus detection circuit 43b outputs an off-focus signal FOS to the MPU 6 when the level of the focus error signal (FES) exceeds a predetermined upper limit value $+V_0$ or a predetermined lower limit value $-V_0$.

The off-focus detection circuit 43b shown in FIG. 10B, comprises a first comparator 431 which compares the level of the output of the above AGC circuit 42 with the above level $+V_0$, and outputs an "H" level when $FES > +V_0$, and a second comparator 432 which compares the level of the output of the above AGC circuit 42 with the above level $-V_0$, and outputs an "H" level when $FES < -V_0$. The logical OR of the outputs of the first and second comparators 431 and 432 is obtained as the above off-focus signal FOS.

The phase compensation circuit 44 in FIG. 10A advances the phase of high frequency components of the focus error signal (FES) by adding a differential of the focus error signal (FES) and a component proportional to the focus error signal (FES).

The servo switch 45 closes the focus servo loop when receiving an active servo-ON signal FSV from the MPU 6, and opens the focus servo loop when receiving a non-active servo-ON signal from the MPU 6.

The focus offset adding circuit 46 receives the digital focus offset value VF supplied from the MPU 6 at the register 461, converts the digital value to analog in the digital to analog converter 462, and adds the analog focus offset value VF to the output of the above servo switch 45.

The power amplifier (PA) 47 amplifies the output of the above focus offset adding circuit 46 to generate a focus actuator driving current FVD. The focus actuator driving current FVD is supplied to the focus actuator 27.

FIG. 11 is a circuit diagram of the track servo control portion 3.

In FIG. 11, reference numeral 30 denotes a TES generation circuit, 31 denotes a total signal generation circuit, 32 denotes an automatic gain control (AGC) circuit, 34a denotes a zero cross detection circuit, 34b denotes an off-track detection circuit, 37 denotes a phase compensating circuit, 38 denotes a servo switch, 39a denotes an inversion amplifier, and 39 denotes a power amplifier.

The TES generation circuit 30 receives the above-mentioned four outputs (reflection signal) SVa, SVb, SVc, and SVd, and generates a track error signal (TES) in accordance with the equation, $TES=(SVa+SVb)-(SVc+SVd)$.

The TES generation circuit 30 shown in FIG. 11, comprises an addition amplifier 300 which outputs a sum of the above SVa and SVb, an addition amplifier 301 which outputs a sum of the above SVc and SVd signals and a subtraction amplifier 302 which outputs the above focus error signal $(FES)=(SVa+SVb)-(SVc+SVd)$.

The total signal generation circuit 31 shown in FIG. 11, comprises an addition amplifier 310 which outputs a sum of the above SVa, SVb, SVc and SVd signals, and generates a total reflection signal (DSC) in accordance with the equation, $DSC=(SVa+SVb)+(SVc+SVd)$. The total reflection signal DSC indicates a total reflection level of the reflected light beam.

The AGC circuit 32 obtains an AGC output by dividing the value of the above track error signal (TES) by the value of the above total reflection signal (DSC). Thus, corrections for variations of the intensity of the impinging light beam and the reflection rate are made for the track error signal (TES).

The zero cross detection circuit 34a outputs a zero cross signal TZC to the MPU 6 when a zero cross point of the track error signal (TES) level is detected.

The off-track detection circuit 34b outputs an off-track signal TOS to the MPU 6 when the level of the track error signal (TES) exceeds a predetermined upper limit value $+V_0$ or a predetermined lower limit value $-V_0$.

The phase compensation circuit 37 advances the phase of high frequency components of the track error signal (TES) by adding a differential of the track error signal (TES) and a component proportional to the track error signal (TES).

The concrete construction of the above AGC circuit 32, the zero cross detection circuit 34a, the off-track detection circuit 34b, and the phase compensation circuit 37 each have the same construction as the similar components shown in FIGS. 10A and 10B for the focus servo control portion 4.

The servo switch 38 closes the track servo loop when receiving an active servo-ON signal TSV from the MPU 6, and opens the track servo loop when receiving a non-active servo-ON signal from the MPU 6.

The inversion amplifier 39a inverts the output of the servo switch 38.

The power amplifier (PA) 39 amplifies the output of the inversion amplifier 39a to generate a track actuator driving current TVD. The track actuator driving current TVD is supplied to the track actuator 26.

FIGS. 12A and 12B are circuit diagrams of the RF signal amplitude detecting portion 5.

FIG. 12A is an RF sum signal generation circuit. In FIG. 12A, the aforementioned four outputs (reflection signals) SVa, SVb, SVc, and SVd of the four light sensing detectors of the light sensing device 28, are each applied to one terminal of a corresponding one of capacitors 501a, 501b, 501c, and 501d, where the other terminals of each of the capacitors 501a, 501b, 501c, and 501d are connected to each other. Thus, a sum of the AC components of the above four inputs SVa, SVb, SVc, and SVd is obtained, and is applied to an amplifier 502. Thus, RF (sum) signals RF1 and RF2 (the inverted signal of RF1) are obtained as the output of the amplifier 502.

An example of the waveform of the above RF (sum) signal RF1 is shown in FIG. 13 for each of the cases when a (track) portion of an optical disc where data is written in each sector portion of the track is scanned during the offset adjusting operation, and when a (track) portion of an optical disc where no data is written in each sector portion of the track is scanned during the offset adjusting operation. As explained later, an ID code is preformed before each section of each track when each optical disc is manufactured before data is written.

In the construction of FIG. 12B, reference numeral 51 denotes a differential circuit, 52 denotes an envelope generation circuit, 53 denotes a sector mark detection circuit, 54 denotes a shift register, and 55 denotes a sample hold circuit.

The above-mentioned RF signals RF1 and RF2 are each input into the differential circuit 51. The differential circuit 51 comprises: a pair of differential circuits each of which comprises a capacitor (C1) 511 and 512 and a resistor (R1) 513 and 514, a pair of transistors TR1 and TR2, a pair of capacitors 515 and 516, and an amplifier 517. The characteristic of the differentiation of the input RF1 is determined by the capacitor (C1) 511 and the resistor (R1) 513. The characteristic of the differentiation of the input RF2, is the same as the characteristic of the differentiation of the input RF1. The amplifier 517, together with transistors TR1 and TR2 and the capacitors 515 and 516 form a differential amplifier. Thus, the differentiated RF signals DRF1 and DRF2 are obtained as outputs of the amplifier 517.

The characteristic of the above differentiation is such that a frequency component which is generated by a modulation caused by a pit located on a track of said optical disc, is extracted from the RF signals RF1 and RF2, and is determined based on the dimensions of the pit, the track, and the beam spot size, and the velocity of scanning of the beam on the track.

The above differentiated RF signals DRF1 and DRF2 are input into the envelope generation circuit 52. The envelope generation circuit 52 comprises capacitors 521 and 525, resistors 522 and 524, and a diode 523 which form a detector circuit. The envelope EDRF of the above differentiated RF signals DRF1 and DRF2 are obtained as the output of the envelope generation circuit 52.

An example of the waveform of the above envelope signal EDRF is shown in FIG. 13 for each of the cases when a (track) portion of an optical disc where data is written in each sector portion of the track is scanned during the offset adjusting operation, and when a (track) portion of an optical disc where no data is written in each sector portion of the track is scanned during the offset adjusting operation.

The sector mark detection circuit 53 in FIG. 12B detects a sector mark in the above-mentioned preformed ID code portion at the beginning of each sector portion of each track. The construction of the sector mark detection circuit is well-known.

Figure 14:
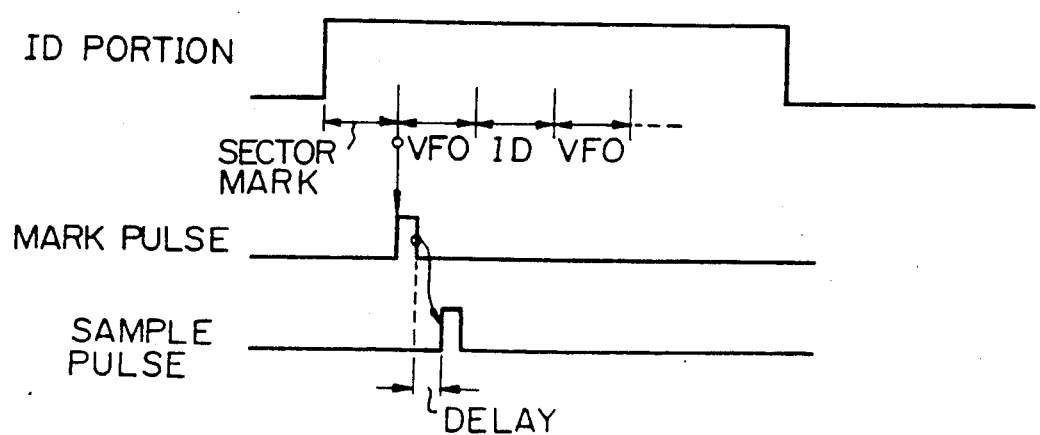
FIG. 14 shows the content of the ID code, which is in accordance with the ISO standard.

The content of the ID code, which is in accordance with the ISO standard, is shown in FIG. 14. The ID code portion includes a sector mark, a VFO code, and an ID number. The VFO code includes synchronization bits having a predetermined repeated pattern provided for pulling-in a timing signal. The VFO code is the same for all sectors and tracks. The VFO code, and the ID numbers are repeated three times in each ID code portion. As shown in FIG. 14, the sector mark detection circuit 53 outputs a mark pulse when the sector mark is detected. The mark pulse is delayed in the shift register 54, and the output of the shift register 54 is applied to the sample and hold circuit 55 as a sampling pulse. The timing of the sampling pulse is determined so that a value of an envelope of an RF signal corresponding to the above VFO is sampled at each sector for the purpose of the present invention, i.e., for determining the optimum focus offset value. An example of the timings of the mark pulse and the sampling pulse are shown in FIG. 14.

In the sample and hold circuit 55, the envelope of the RF signal is sampled at the timing of the above sampling pulse. The output SEDRF of the sample and hold circuit 55 is shown in FIG. 13 for each of the cases when a (track) portion of an optical disc where data is written in each sector portion of the track is scanned during the offset adjusting operation, and when a (track) portion of an optical disc where no data is written in each sector portion of the track is scanned during the offset adjusting operation.

Since the above sampling is carried out regarding the same code signal VFO, a stable sampling in each sector using a rather low speed (available at a low cost) analog to digital converter is possible, and further, a stable and simple operation for determining the optimum offset value is possible.

The above sampled value SEDRF is converted into digital form in an analog to digital converter (not shown), and is then sent to the MPU 6.

Figure 15:
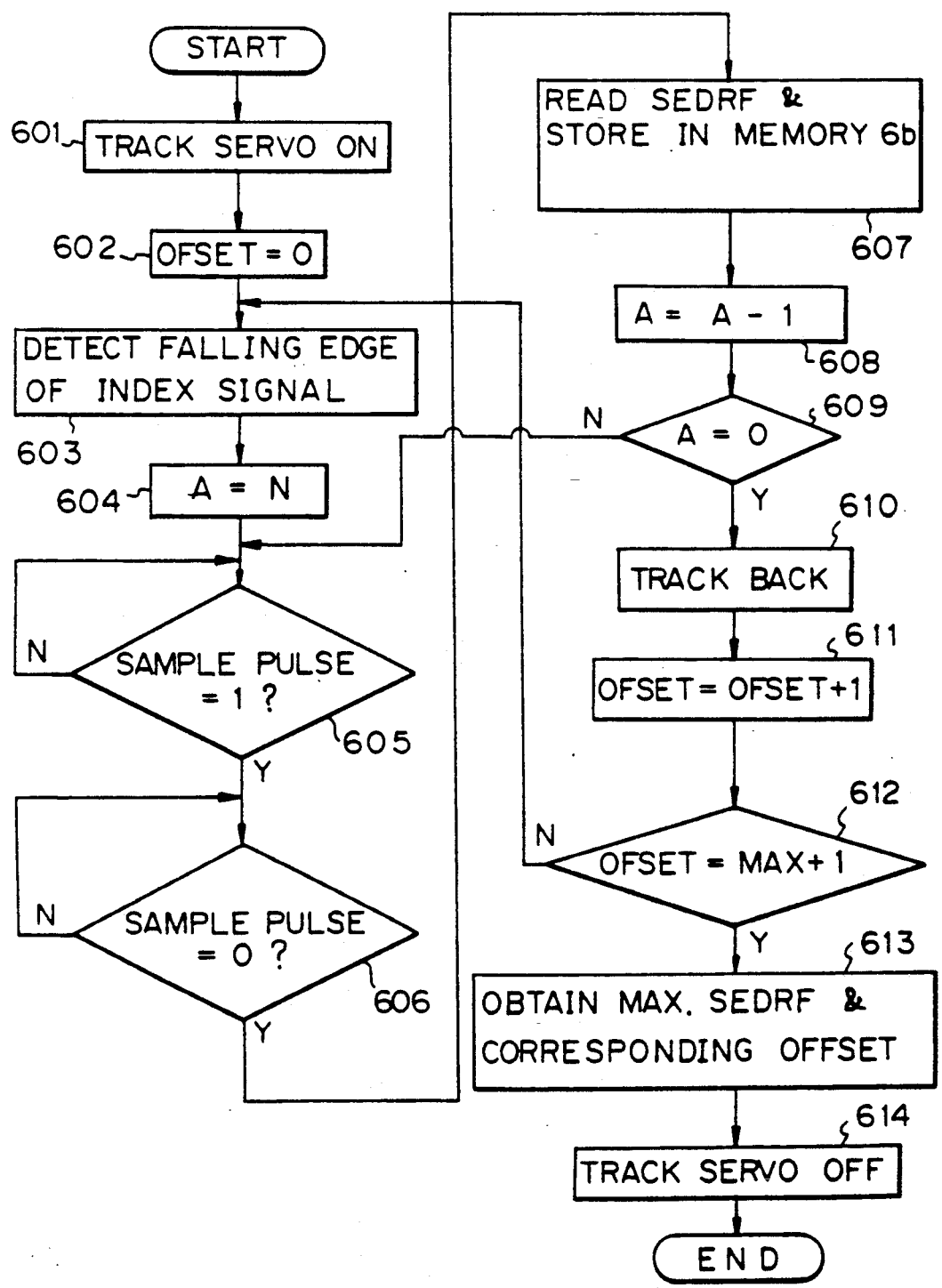
FIG. 15 is a flow of the operation by the MPU 6 in FIG. 9 to obtain the optimum focus offset value.

FIG. 15 is a flowchart of the operation by the MPU 6 in FIG. 9 for obtaining the optimum focus offset value.

In the step 601, the MPU 6 turns the track servo system ON, i. e., the MPU 6 sends an active track servo-ON signal to the servo switch 38 to close the track servo loop.

In the step 602, the MPU 6 sets the initial value of the focus offset zero.

In the step 603, an falling edge of the index signal is detected. The index signal is output at one predetermined angle in each rotation of the optical disc, and the index signal is well-known. When the index signal is detected, the MPU 6 sets the focus offset value in the aforementioned register 461 shown in FIG. 10. Thus the focus offset value is added to the output of the focus servo control portion 4 of FIG. 10.

In the step 604, a variable "A" is set as A=N, where N is defined by the equation, N=(the number of sectors in one track)−(the number of sectors necessary for kicking back)−(the number of sectors necessary for detecting a falling edge of the index signal). For example, when the number of sectors in one track is 17, the number of sectors necessary for kicking back is one, and the number of sectors necessary for detecting a falling edge of the index signal is two, N=14.

In the step 605, it is determined whether or not the sampling pulse is "1". If the sampling pulse is "1" in the step 605, it is next determined whether or not the sampling pulse is "0" in the step 606. Thus, if it is determined that the sampling pulse is "0" in the step 606 (this means that the falling edge of the sampling pulse is detected) the MPU 6 reads the sampled value SEDRF of a digital amplitude of the RF signal RF1 from the output of the above-mentioned analog to digital converter in the step 607, and stores the value in the work area (memory) 6b shown in FIG. 9.

Next, in the step 608, the above-mentioned variable A is decremented to A−1. Then, in the step 609, it is determined whether or not the variable A is equal to zero. If it is determined that the variable A is not equal to zero, the operation goes to the step 605 to continue the operation of collecting the sampled values. Or if it is determined that the variable A is equal to zero, the operation goes to the step 610 to go back to the starting position in the step 610 (a track back operation is necessary when the track is spirally formed on the recording medium). Then in the step 611, the focus offset value is incremented to collect the sampled values for the incremented value of the focus offset on the same track. The above track back operation is necessary when the track is formed spirally on the optical disc. When the track is formed concentrically on the optical disc, the track back operation in the step 610 is not necessary.

After the step 611, it is determined whether or not the focus offset value exceeds the predetermined maximum value in the step 612. If it is determined that the focus offset value does not exceed the predetermined maximum value, the operation goes to the step 603 to collect the sampling values of SEDRF for the incremented value of the focus offset. If it is determined that the focus offset value exceeds the predetermined maximum value, the operation goes to the step 613 to obtain the focus offset value which gives the maximum SEDRF value using the SEDRF data stored in the memory 6b. Then, in the step 614, the MPU 6 turns the track servo system OFF, i.e., the MPU 6 makes the track servo-ON signal inactive with respect to the servo switch 38 to open the track servo loop.

The timing and the signal levels regarding the above operation are shown in FIG. 16.

What is claimed is:

1. A system for obtaining an optimum focusing position in an optical disc system, comprising:
   optical beam impinging means for impinging an optical beam onto a track of an optical disc;
   reflection signal obtaining means for obtaining a total reflection signal having information regarding a total intensity of an optical beam reflected by an optical disc;
   filtering means for extracting a predetermined frequency component from said total reflection signal, said predetermined frequency component being generated in a total reflecting signal by a modulation caused by an existence of a pit on a track of said optical disc;
   focus position changing means for changing said focus position of said optical beam; and
   optimum focusing position searching means for searching for a focus position providing a predetermined maximum intensity of said predetermined frequency component extracted by said filtering means by changing said focus position by said focus position changing means and monitoring the intensities of the predetermined frequency components for all the changed focus positions;
   said reflection signal obtaining means, comprising:
      a plurality of optical detectors each for detecting an intensity of the received optical beam;
      optical path means for leading said optical beam reflected by said optical disc to said plurality of optical detectors;
      track error signal obtaining means for obtaining a track error signal indicating a degree of off-track of said optical beam impinged on said track, based on a distribution of the intensities detected in said plurality of optical detectors;
      focus error signal obtaining means for obtaining a focus error signal indicating a degree of off-focus of said optical beam impinged on said track, based on a distribution of the intensities detected in said plurality of optical detectors;
      summation obtaining means for obtaining a summation of intensities detected by said plurality of optical detectors, as said total intensity;
   said plurality of optical detectors being arranged in positions around a center axis of an optical path of said optical beam reflected by an optical disc in said optical path means and said filtering means extracting said predetermined frequency component from said summation of intensities.

2. A system according to claim 1, wherein said filtering means comprises a differentiating means.

3. A system according to claim 1, wherein said optimum focusing position searching means comprises enveloping means for obtaining the output of said filtering means.

4. A system according to claim 3, wherein said optimum focusing position searching means further comprises sampling means for sampling the output of said enveloping means.

5. A system according to claim 4, wherein said sampling means carries out said sampling at a portion on a track, where a common predetermined pattern is written, for all focusing positions in said scanning operation.

6. A system according to claim 1, further comprising a track servo control means for maintaining a position of the surface of said optical disc where said optical beam is impinging in an optimum position on a track.

7. A system according to claim 6, wherein said filtering means comprises different means.

8. A system according to claim 6, wherein said optimum focusing position searching means comprises enveloping means for obtaining the output of said filtering means.

9. A system according to claim 8, wherein said optimum focusing position searching means further comprises: sampling means for sampling the output of said enveloping means.

10. A system according to claim 9, wherein said sampling means carries out said sampling at a portion on a track where a common predetermined pattern is written, for all focusing positions in said scanning operation.

11. A focus servo control system for maintaining an optimum focusing position in an optical disc system during reading and writing operations, comprising:
    optical beam impinging means for impinging an optical beam onto a track of an optical disc;
    reflection signal obtaining means for obtaining total reflection signal having information regarding a total intensity of an optical beam reflected by an optical disc;
    focus position changing means for changing said focusing position of the optical disc system;
    servo control means for controlling said focus position changing means according to said reflection signal;
    offset changing means for changing an offset used to compensate an error arising from a construction of said servo control system;
    filtering means for extracting a predetermined frequency component from said total reflection signal, said predetermined frequency component being generated in a total reflecting signal by a modulation caused by the existence of a pit located on a track of said optical disc; and
    optimum offset value searching means for searching for an optimum value of said offset, providing a predetermined maximum intensity of said offset by said offset changing means and monitoring the intensity of the predetermined frequency component for all the changed offset values, during an offset adjusting operation.

12. A system according to claim 11, wherein said filtering means comprises differentiating means.

13. A system according to claim 11, wherein said optimum offset value obtaining means comprises enveloping means for obtaining the output of said filtering means.

14. A system according to claim 13, wherein said optimum offset value obtaining means further comprises sampling means for sampling the output of said enveloping means.

15. A system according to claim 14, wherein said sampling means carries out said sampling at a portion on a track where a common predetermined pattern is written, for all offset values used in said scanning operation.

16. A system according to claim 11, further comprising a track servo control means for maintaining a position of the surface of said optical disc where said optical beam is impinging, in an optimum position on a track.

17. A system according to claim 16, wherein said filtering means comprises differentiating means.

18. A system according to claim 16, wherein said optimum offset value obtaining means comprises enveloping means for obtaining the output of said filtering means.

19. A system according to claim 18, wherein said optimum offset value obtaining means further comprises sampling means for sampling the output of said enveloping means.

20. A system according to claim 19, wherein said sampling means carries out said sampling at a portion on a track where a common predetermined pattern is written, for all offset values used in said scanning operation.

21. A system according to claim 1, further comprising track servo means for maintaining a position of said optical beam impinging on the track at a center of a width of the track.

22. A system according to claim 11, further comprising track servo means for maintaining a position of said optical beam impinging on the track at a center of a width of the track.

23. A system according to claim 11, wherein said reflection signal obtaining means comprises:
a plurality of light detectors; and
focus error signal (FES) generating means for generating an FES signal which indicates an amount of offset from the optimum focusing position, said FES signal being a predetermined function of intensities of light detected by said plurality of light detectors, said servo control means receiving said FES signal and controlling said focus position changing means so that said offset from the optimum focusing position is reduced to zero.

24. A system according to claim 11, wherein said reflection signal obtaining means comprises:
a plurality of optical detectors each for detecting an intensity of the received optical beam;
optical path means for leading said optical beam reflected by said optical disc to said plurality of optical detectors;
track error signal obtaining means for obtaining a track error signal indicating a degree of off-track of said optical beam impinged on said track, based on a distribution of the intensities detected in said plurality of optical detectors;
focus error signal obtaining means for obtaining a focus error signal indicating a degree of off-focus of said optical beam impinged on said track, based on a distribution of the intensities detected in said plurality of optical detectors; and
summation obtaining means for obtaining a summation of intensities detected by said plurality of optical detectors, as said total intensity,
wherein said plurality of optical detectors are arranged in positions around a center axis of an optical path of said optical beam reflected by an optical disc, in said optical path means; and wherein
said filtering means extracts said predetermined frequency component from said summation of intensities.

25. A focus offset adjustment system which uses a signal reflected from an optical disc to automatically adjust a focus offset value giving an optimal beam spot, said focus offset adjustment system comprising:
an optical head, including a plurality of light receivers, which irradiates a beam spot on the optical disc and receives the reflected light through the plurality of light receivers;
a focus servo control unit which controls a focusing position of the beam spot based on a focus error signal obtained from the plurality of received light signals received by said optical head and a given focus offset value; and
a sum signal amplitude detection unit which detects the amplitude of the sum of RF signals in the received light signals received by said plurality of light receivers of said optical head in accordance with a successive change of the focus offset value input to said focus servo control unit
the focus offset value providing a maximum amplitude detected by said sum signal amplitude detection unit being output to said focus servo control unit for controlling the focusing position.

26. A focus offset adjustment system according to claim 25, wherein when detecting the amplitude of the sum of the RF signals of the received light signals received by said plurality of light receivers of said optical head, the amplitudes of the signals are detected after differentiation of the signals of the sum of the RF signals of the corresponding received light signals.

27. A focus offset adjustment system according to claim 25, wherein when detecting the amplitude of the sum of the RF signals of the received light signals received by said plurality of light receivers of said optical head, the amplitudes of ID portions formatted in the optical discs are detected.

28. A focus offset adjustment system according to claim 27, wherein the amplitudes are detected by sampling and holding the amplitudes of portions of the ID portions where same patterns repeatedly appear and, wherein an A/D converter performs an A/D conversion.

29. A focus offset adjustment system according to claim 26, wherein when detecting the amplitude of the sum of the RF signals of the received light signals received by said plurality of light receivers of said optical head, the amplitudes of ID portions formatted in the optical discs are detected.

30. A focus offset adjustment system according to claim 29, wherein the amplitudes are detected by sampling and holding the amplitudes of portions of the ID portions where same patterns repeatedly appear and, wherein an A/D converter performs an A/D conversion.

* * * * *